United States Patent
Oikawa et al.

(10) Patent No.: US 6,884,520 B2
(45) Date of Patent: Apr. 26, 2005

(54) PERPENDICULAR MAGNETIC RECORDING MEDIUM AND METHOD OF MANUFACTURING THE SAME AND PRODUCT THEREOF

(75) Inventors: Tadaaki Oikawa, Nagano (JP); Hiroyuki Uwazumi, Nagano (JP); Shunji Takenoiri, Nagano (JP); Miyabi Nakamura, Ibaragi (JP)

(73) Assignee: Fuji Electric Co., Ld. (JP)

( * ) Notice: Subject to any disclaimer, the term of this patent is extended or adjusted under 35 U.S.C. 154(b) by 3 days.

(21) Appl. No.: 10/314,898

(22) Filed: Dec. 9, 2002

(65) Prior Publication Data

US 2003/0152809 A1 Aug. 14, 2003

(30) Foreign Application Priority Data

Dec. 7, 2001 (JP) .................................... 2001-374896

(51) Int. Cl.$^7$ ................................................ G11B 5/66
(52) U.S. Cl. .................... 428/611; 428/660; 428/666; 428/675; 428/678; 428/323; 428/694 TS; 427/131; 427/132
(58) Field of Search .............................. 428/611, 660, 428/666, 675, 678, 323, 694 TS; 427/131, 132

(56) References Cited

U.S. PATENT DOCUMENTS

| | | | |
|---|---|---|---|
| 4,722,869 A * | 2/1988 | Honda et al. | 428/611 |
| 5,049,451 A | 9/1991 | Lal et al. | 428/611 |
| 5,679,473 A | 10/1997 | Murayama et al. | 428/694 T |
| 5,736,262 A | 4/1998 | Ohkijima et al. | 428/611 |
| 5,815,342 A | 9/1998 | Akiyama et al. | 360/97.01 |
| 5,981,039 A | 11/1999 | Isono et al. | 428/199 |
| 5,981,054 A | 11/1999 | Hikosaka et al. | 428/328 |
| 6,086,974 A | 7/2000 | Thiele et al. | 428/65.3 |
| 6,183,893 B1 | 2/2001 | Futamoto et al. | 428/694 TS |
| 6,248,416 B1 * | 6/2001 | Lambeth et al. | 428/65.3 |
| 6,416,839 B1 | 7/2002 | Xuan et al. | 428/65.4 |
| 6,447,936 B1 | 9/2002 | Futamoto et al. | 428/694 TM |
| 6,524,724 B1 | 2/2003 | Cheng et al. | 428/611 |
| 6,589,669 B1 | 7/2003 | Uwazumi et al. | 428/611 |
| 6,602,620 B1 | 8/2003 | Kikitsu et al. | 428/694 T |

(Continued)

FOREIGN PATENT DOCUMENTS

| | | | |
|---|---|---|---|
| JP | 02-227814 A | 9/1990 |
| JP | 02-287918 A | 11/1990 |

(Continued)

OTHER PUBLICATIONS

US RE37,748, 6/2002, Chen et al. (withdrawn)
JPO Abstract of JP 2000–322726–A.*

(Continued)

Primary Examiner—Kevin M. Bernatz
(74) Attorney, Agent, or Firm—Rossi, Kimms & McDowell

(57) ABSTRACT

A perpendicular magnetic recording medium has a nonmagnetic substrate, a nonmagnetic underlayer, a magnetic layer, a protective film, and a liquid lubrication layer sequentially laminated on the substrate. The nonmagnetic layer is composed of a metal or alloy having a hcp crystal structure. The magnetic recording layer consists of ferromagnetic crystal grains and a nonmagnetic grain boundary phase mainly composed of an oxide surrounding the grains. A seed layer of a metal or alloy having a fcc crystal structure can be provided under the nonmagnetic underlayer, and a nonmagnetic alignment control layer can be provided under the seed layer. The recording medium can provide high output and low noise by improving the alignment of the magnetic recording layer, reducing the initial growth layer in the magnetic recording layer, and minimizing the grain size of the magnetic recording layer.

28 Claims, 1 Drawing Sheet

U.S. PATENT DOCUMENTS

| | | | |
|---|---|---|---|
| 6,638,648 B1 | 10/2003 | Yamamoto et al. .. 428/694 TM |
| 6,667,116 B1 * | 12/2003 | Uwazumi et al. ...... 428/694 TS |
| 6,682,826 B1 * | 1/2004 | Shimizu et al. ............. 428/611 |
| 6,716,543 B1 * | 4/2004 | Uwazumi et al. ...... 428/694 TS |
| 6,794,028 B1 | 9/2004 | Uwazumi et al. ........... 428/366 |
| 2001/0027868 A1 * | 10/2001 | Carisella .................... 166/387 |
| 2002/0018917 A1 | 2/2002 | Sakai et al. .......... 428/694 TM |
| 2002/0058159 A1 | 5/2002 | Kubota et al. ....... 428/694 TM |
| 2002/0058160 A1 * | 5/2002 | Oikawa et al. ......... 428/694 TS |
| 2003/0049495 A1 | 3/2003 | Sakai et al. .......... 428/694 TM |
| 2003/0064253 A1 * | 4/2003 | Uwazumi et al. ...... 428/694 TP |
| 2003/0157375 A1 * | 8/2003 | Uwazumi et al. ...... 428/694 TP |
| 2004/0027868 A1 | 2/2004 | Nakamura et al. .......... 365/199 |
| 2004/0043258 A1 * | 3/2004 | Yamamoto et al. .. 428/694 TM |

FOREIGN PATENT DOCUMENTS

| | | | |
|---|---|---|---|
| JP | 8-255342 A | | 10/1996 |
| JP | 11-134634 A | | 5/1999 |
| JP | 2000-322726 A | * | 11/2000 |
| JP | 2002-25031 A | | 1/2002 |

OTHER PUBLICATIONS

"High Performance CoPtCrO Sigle Layered Perpendicular Media with No Recording Demagnetization"; Soichi Oikawa et al.; IEEE Transactions on Magnetics,, vol. 36, No. 5; Sep. 2000; pp. 2393–2395.

* cited by examiner

Thickness of magnetic recording layer [nm]

PERPENDICULAR MAGNETIC RECORDING MEDIUM AND METHOD OF MANUFACTURING THE SAME AND PRODUCT THEREOF

BACKGROUND

High density magnetic recording can be attained with a perpendicular magnetic recording system, as an alternative to a conventional longitudinal magnetic recording system. In this regard, a crystalline film of a CoCr alloy system has been mainly contemplated for a magnetic recording layer of a perpendicular magnetic recording medium. In perpendicular magnetic recording, the crystal orientation of the recording layer is controlled so that the c-axis of the CoCr alloy system having a hcp structure aligns perpendicular to the film surface (i.e., the c-plane is parallel to the film surface). To obtain a higher density in the CoCr alloy system, finer grain size, reduction of dispersion of grain size distribution, and decrease in magnetic interaction between grains have been contemplated.

A conventional metallic magnetic film of a CoCr system is deposited on a substrate at a high temperature. A grain boundary phase is formed by segregating chromium from the magnetic grains of the cobalt system. The grain boundary phase reduces magnetic interaction between magnetic grains. When this method is employed, the substrate needs to be heated to at least 200° C. before laminating or depositing the layers on the substrate.

A method of controlling the magnetic recording layer structure to raise the recording density in a longitudinal magnetic recording medium has been proposed, for example, in Japanese Unexamined Patent Application Publication No. H8-255342 and U.S. Pat. No. 5,679,473. These references disclose a magnetic recording layer having a structure generally referred to as a granular magnetic recording layer, where each of its magnetic grains is surrounded by a nonmagnetic, nonmetallic substance, such as an oxide or nitride. Because the nonmagnetic and nonmetallic grain boundary phase physically separates the magnetic grain in the granular magnetic film, the magnetic interaction between the magnetic grains decreases to suppress the formation of a zigzag shaped magnetic domain wall that would be formed in a transition region of a recording bit. Thus, low noise can be achieved. It is known in such a granular magnetic recording layer that the interaction between magnetic grains can be reduced even if substrate heating is not performed. This is because the nonmagnetic, nonmetallic substance used for the grain boundary phase segregates easier than conventionally used chromium, and thus can be segregated without heating.

In the same vein, a granular magnetic recording layer is contemplated for a recording layer of a perpendicular magnetic recording medium combining the above-described techniques in IEEE Trans. Mag., Vol. 36, p2393 (2000). Specifically, this publication discloses a perpendicular recording medium that comprises a ruthenium metal underlayer and a magnetic recording layer of a CoPtCrO alloy having a granular structure. The c-axis alignment enhances with increased thickness of the ruthenium underlayer for the granular magnetic recording layer. The thickness of the ruthenium underlayer, however, needs to be about 40 nm or more to obtain satisfactory magnetic characteristics and electromagnetic conversion performance in the granular perpendicular magnetic recording medium. Since ruthenium is an expensive rare metal element, it is desirable to reduce the thickness of the ruthenium underlayer to reduce the production cost.

A so-called double layer perpendicular magnetic recording medium has been proposed, where a soft magnetic backing layer is included under the magnetic recording layer to enhance the sharpness of the magnetic field generated at a head region. To enhance recording density of such a magnetic recording medium, the thickness of the nonmagnetic layer disposed between the magnetic recording layer and the soft magnetic backing layer needs to be no greater than 20 nm. Consequently, the above-described structure having a thick ruthenium underlayer poses technological restriction to producing a double layer perpendicular magnetic recording medium.

To attain a higher recording density, noise has to be reduced. One of the factors that deteriorate performance of a perpendicular recording medium is increase in dispersion of orientation distribution in the magnetic recording layer. The axis of easy magnetization of the magnetic recording layer in a perpendicular recording medium needs to be aligned perpendicular to the surface of the medium. If the dispersion of orientation distribution of the axis of easy magnetization is large, the output signal decreases due to decrease of the perpendicular component of the magnetic flux. In addition, the transition looses sharpness and noises increase. Therefore, the dispersion of orientation distribution in the magnetic recording layer needs to be reduced as small as possible to achieve high output and low noise in a perpendicular magnetic recording medium.

In addition to reducing the dispersion of orientation distribution, the initial growth layer of a magnetic recording layer needs to be decreased to improve the performance of a perpendicular recording medium. A magnetic recording layer of a conventional perpendicular magnetic recording medium includes an initial growth layer of several nm having an in-plane component of magnetization. The initial growth layer is a source of noise. This is considered to be caused by an inferior alignment of the underlayer of the titanium alloy used in a conventional perpendicular magnetic recording medium or interdiffusion between the underlayer and the magnetic recording layer. From the view point of recording, a thin magnetic recording layer is desirable. However, if the initial growth layer exists and the film thickness is decreased, the relative proportion occupied by the initial growth layer increases, decreasing the S/N ratio (SNR). That is, the initial growth layer inhibits reduction of the thickness of a magnetic recording layer.

In addition to the above, noise reduction of a magnetic recording medium requires decrease in the grain size of the magnetic recording layer. When the grain size of the magnetic recording layer increases, a bit transition region becomes zigzag shaped and the transition noise increase. Accordingly, reduction of the transition noises requires a smaller grain size and the bit transition region needs to be strait line shape.

Accordingly, to improve the performance of a perpendicular magnetic recording medium, the dispersion of orientation distribution in the magnetic recording layer needs to be decreased, the initial growth layer in the magnetic recording layer needs to be reduced, and the grain size of the magnetic recording layer needs to be reduced. The present invention addresses ways of improving the performance of a perpendicular magnetic recording medium.

SUMMARY OF THE INVENTION

The present invention relates to a perpendicular magnetic recording medium and a manufacturing method thereof.

Such a recording medium can be mounted on various magnetic recording devices, such as an external memory device of a computer.

One aspect of the present invention is a perpendicular magnetic recording medium having a nonmagnetic substrate and a nonmagnetic alignment control layer, a seed layer, a nonmagnetic underlayer, a magnetic recording layer, and a protective film laminated sequentially on the substrate. A liquid lubrication layer is formed on the protective film. The seed layer is composed of a metal or alloy having a fcc crystal structure formed on the alignment control layer. The nonmagnetic underlayer is composed of a metal or alloy having a hcp crystal structure formed on the seed layer. The magnetic recording layer, consisting essentially of ferromagnetic crystal grains and a nonmagnetic grain boundary phase mainly of an oxide surrounding the ferromagnetic crystal grains, is formed on the underlayer. The protective film is formed on the recording layer.

The nonmagnetic substrate can be composed of a plastic resin.

The nonmagnetic alignment control layer can be composed of a nonmagnetic metal selected from Nb, Mo, Ta, and W that has a bcc crystal structure, or a nonmagnetic alloy having a bcc crystal structure, and containing at least one of Nb, Mo, Ta, and W. The nonmagnetic alignment control layer also can be composed of NiP or CoZr having an amorphous structure.

The seed layer can be composed of a metal containing Cu, Au, Pd, Pt, and Ir, of an alloy containing at least one of Cu, Au, Pd, Pt, and Ir, or of an alloy containing at least Ni and Fe.

The nonmagnetic underlayer can be composed of a ruthenium base alloy having the hcp structure. The ruthenium base alloy can contain at least one of C, Cu, W, Mo, Cr, Ir, Pt, Re, Rh, Ta, and V. More specifically, the ruthenium base alloy can contain at least one of at most 32 at % of tungsten, at most 36 at % of molybdenum, at most 40 at % of chromium, at most 44 at % of iridium, at most 20 at % of platinum, at most 60 at % of rhodium, at most 20 at % of tantalum, and at most 16 at % of vanadium.

The oxide forming the nonmagnetic grain boundary phase in the magnetic recording layer can be selected from Cr, Co, Si, Al, Ti, Ta, Hf, and Zr.

Another aspect of the present invention is a method of manufacturing the above described perpendicular magnetic recording medium. The method involves depositing the nonmagnetic alignment control layer on the substrate, depositing the seed layer on the alignment control layer, depositing the nonmagnetic underlayer on the seed layer, depositing the magnetic recording layer on the underlayer, and depositing the protective film on the recording layer. All of these layers and film can be deposited without preheating the substrate.

Another aspect of the present invention is the perpendicular magnetic recording medium produced according to the above described method.

DETAILED DESCRIPTION

The performance of magnetic recording media can be improved by improving the output signal while reducing noise by (1) improving the alignment in the magnetic recording layer, (2) reducing the initial growth layer in the magnetic recording layer, and (3) reducing the grain size of the magnetic recording layer. In this respect, the underlayer plays an important role in decreasing the dispersion of orientation distribution in the magnetic recording layer and minimizing the thickness of the initial growth layer as close to zero as possible. The reasons are: (a) alignment in the magnetic recording layer is improved by selecting a well-aligned underlayer; and (b) matching of the lattice constants between the underlayer and the magnetic recording layer improves epitaxial growth at the interface between the underlayer and the magnetic recording layer, which in turn reduces the initial growth layer in the magnetic recording layer. It is well known that the grain size of a magnetic recording layer that is epitaxially grown on an underlayer follows the grain size of the underlayer. Therefore, c) reduction of the grain size in the underlayer is essential for reducing the grain size of the magnetic recording layer.

The present inventors have discovered a way of further reducing noise by using a nonmagnetic underlayer composed of a ruthenium base alloy and using a granular film as a magnetic recording layer, which allows minimization of the grain size of the magnetic recording layer without difficulty. An excellent perpendicular magnetic recording medium can be obtained by such a layer construction.

When a granular film is used for a magnetic recording layer, substrate heating is unnecessary to isolate the magnetic grains of that layer. As a result, the production process can be simplified, as well as reducing the production cost. Further, the substrate can be composed of inexpensive plastics, as well as conventional aluminum and glass.

Figure 1:
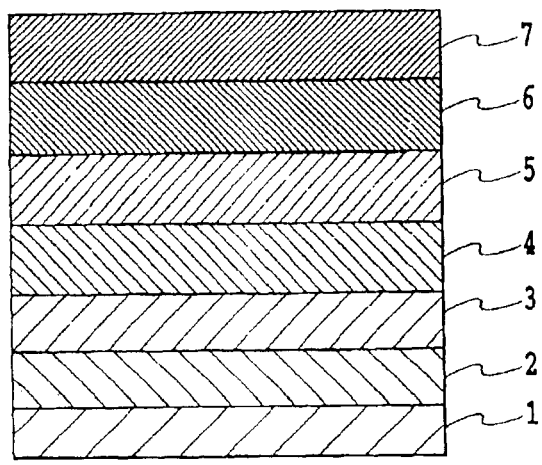
FIG. 1 is a schematic cross-sectional view of a perpendicular magnetic recording medium according to the present invention.

FIG. 1 is a schematic cross sectional view of a perpendicular magnetic recording medium according to the present invention. The perpendicular magnetic recording medium has a structure comprising a nonmagnetic substrate 1, and a nonmagnetic alignment control layer 2, a seed layer 3, a nonmagnetic underlayer 4, a magnetic recording layer 5, and a protective layer 6 that are sequentially formed or laminated on the substrate 1. On the top of the laminated substrate, a liquid lubrication layer 7 is formed.

The nonmagnetic substrate 1 can be made of NiP-plated aluminum alloy, strengthened glass, or crystallized glass, which are all conventionally used in a magnetic recording medium. Because a manufacturing method of the present invention does not need substrate heating, the substrate can be made by injection molding a plastic resin, such as polycarbonate or polyolefin. This plastic resin substrate is inexpensive and has the advantage in that a texturing process can be easily conducted.

The nonmagnetic alignment control layer 2 needs to be composed of a metal or alloy having a body centered cubic (bcc) lattice structure or an amorphous structure. By providing such an alignment control layer, the tendency to align in (111) plane of the fcc structure of the seed layer formed on this alignment control layer can be further enhanced. Thus, characteristics of the magnetic recording layer can be improved by promoting the alignment of the nonmagnetic underlayer. This effect is most significant when the material having a bcc structure is a nonmagnetic metal selected from Nb, Mo, Ta, and W, or a nonmagnetic alloy containing at least one element selected from Nb, Mo, Ta, and W. A material having an amorphous structure, such as NiP or CoZr, also can be used. The thickness of the nonmagnetic alignment control layer 2 is preferably at least 3 nm, more preferably 5 nm or more, for controlling the crystal alignment of the seed layer 3.

The seed layer 3 can be composed of a metal selected from Cu, Au, Pd, Pt, and Ir, an alloy containing at least one element selected from Cu, Au, Pd, Pt, and Ir, or an alloy containing at least Ni and Fe. Specific examples of the alloy containing at least Ni and Fe include Ni15Fe25Cr, Ni18Fe25Cr, and Ni15Fe30Cr. When one of these materials having a fcc crystal structure is laminated on a substrate, the (111) plane that is the closest-packed plane of the fcc crystal structure tends to align parallel to the film surface. Since the nonmagnetic underlayer 4 in the present invention has an hcp crystal structure, when the underlayer is laminated on the seed layer, aligning in (111) plane of the fcc structure, the hcp (002) plane that best matches the seed layer tends to grow aligningly parallel to the film surface. By laminating a granular magnetic layer on such a nonmagnetic underlayer, the metallic crystal grains in the magnetic recording layer also grow with their hcp (002) plane, aligning parallel to the film surface, and the c-axis orienting perpendicular to the film surface, to provide an excellent perpendicular magnetic recording medium. The employment of these materials effectively provides favorable lattice matching between the seed layer and the nonmagnetic underlayer, and between the nonmagnetic underlayer and the granular magnetic recording layer.

The thickness of the seed layer is at least 3 nm, more preferably 5 nm or more to control the orientation of the nonmagnetic underlayer. In a double-layered perpendicular magnetic recording medium provided with a soft magnetic backing layer under the seed layer, the thickness of the seed layer needs to be as thin as possible insofar as alignment control is possible, because the distance between the recording layer and the soft magnetic backing layer is preferably as small as possible. Thus, the thickness of the seed layer is preferably in the range of 3 to 20 nm.

The nonmagnetic underlayer 4 needs to be a metal or alloy having a hexagonal closest-packed (hcp) crystal structure. The underlayer is formed of a ruthenium-base alloy added with one or more materials selected from the group consisting essentially of C, Cu, W, Mo, Cr, Ir, Pt, Re, Rh, Ta, and V. The relative content of the additive with respect to ruthenium is not restricted in the case of the additives of C, Cu, and Re. However, an additive of W, Mo, Cr, Ir, Pt, Rh, Ta, or V needs to be mixed within to the extent that no phase other than a hcp-ruthenium phase is formed at the time of thin film deposition. Specifically, the addition is restricted within the maximum values of 32 at % for W, 36 at % for Mo, 40 at % for Cr, 44 at % for Ir, 20 at % for Pt, 60 at % for Rh, 20 at % for Ta, and 16 at % for V. A ruthenium base alloy containing one or more of these materials exhibits excellent alignment characteristics and has a fine grain size when formed on a seed layer 3. The ruthenium base alloy provides superior epitaxial growth with the magnetic recording layer, and suppresses the initial growth layer in the magnetic recording layer.

It is desirable for the thickness of the nonmagnetic underlayer to be at least 2 nm, preferably 5 nm or more, to control the alignment of the granular magnetic recording layer. However, the thickness of the nonmagnetic underlayer needs to be as thin as possible in view toward reducing the production cost and for the purpose of attaining a minimum distance between the recording layer and the soft magnetic backing layer in a double layer perpendicular magnetic recording medium insofar as alignment control of the magnetic recording layer is possible. Thus, the thickness of the nonmagnetic underlayer is preferably in the range of 2 to 40 mm.

A magnetic recording layer 5 in a perpendicular magnetic recording medium according to the present invention is a so-called granular magnetic recording layer. The layer comprises ferromagnetic crystal grains and a nonmagnetic grain boundary phase surrounding the grains. The grain boundary phase is composed of a metal oxide or nitride. As disclosed in U.S. Pat. No. 5,679,473, the granular structure can be deposited by a sputtering method using a ferromagnetic target containing the oxide that composes the grain boundary, or by a reactive sputtering method using a ferromagnetic metallic target in oxygen-containing argon gas. According to these methods, each of the ferromagnetic crystal grains can be isolated by the grain boundary without substrate heating.

An alloy of CoPt system is one of the preferable materials for composing the ferromagnetic crystal grains. To reduce media noise, in particular, it is desirable to add at least one element selected from Cr, Ni, and Ta to the CoPt alloy. To form a stable granular structure, it is particularly desirable to form the nonmagnetic grain boundary using an oxide of at least one element selected from Cr, Co, Si, Al, Ti, Ta, Hf, and Zr. The magnetic recording layer should be sufficiently thick as necessary to provide sufficient head regeneration output and recording resolution.

A thin film composed mainly of carbon, for example, can be used for the protective film 6. Also, various thin film materials can be used that are commonly employed as a protective film of a magnetic recording medium. A perfluoropolyether lubricant, for example, can be used for the liquid lubrication layer 7. Also, various lubricant materials that are commonly employed as a material for a liquid lubrication layer of a magnetic recording medium can be used.

In the case of manufacturing a double layer perpendicular magnetic recording medium, to enhance the sharpness of the magnetic field generated at the head region, either of the two methods can be employed: 1) use a seed layer of NiFe soft magnetic alloy with a fcc structure as a soft magnetic backing layer; or 2) use a thin film of NiFe soft magnetic alloy with a fcc structure as a seed layer, the thin film being provided over the nonmagnetic backing layer made of other material. By laminating a nonmagnetic underlayer and a magnetic recording layer on such a seed layer, alignment control of the nonmagnetic underlayer and the magnetic recording layer can be performed. In this construction, the distance between the magnetic recording layer and the soft magnetic backing layer is substantially reduced to the thickness of the nonmagnetic underlayer. Thus, a superior perpendicular magnetic recording medium can be produced.

The soft magnetic backing layer can be formed of a crystalline FeTaC alloy, Sendust alloy (FeSiAl), or amorphous cobalt alloy such as CoZrNb or CoTaZr. Although the optimum value of the thickness of the soft magnetic backing layer varies depending on the structure and the characteristics of a magnetic head used for recording, the preferable thickness is in the range of 10 nm to 500 nm considering productivity.

Each layer laminated on a nonmagnetic substrate can be formed by means of various deposition techniques that are usually employed in the field of a magnetic recording medium. The techniques that can be employed for forming the layers except for the liquid lubrication layer includes DC magnetron sputtering, RF magnetron sputtering, and vacuum evaporation, for example. A liquid lubrication layer can be formed by means of a dipping method or a spin coating method, for example.

The process of manufacturing a magnetic recording medium having layer construction described above and shown in FIG. 1, while omitting the step of substrate heating, which is required in a conventional magnetic recording medium, still allows a perpendicular magnetic recording medium with a satisfactory c-axis alignment. The production cost can be reduced by virtue of simplifying the production process. Because substrate heating is unnecessary, a substrate made of plastics, such as polycarbonate or polyolefin, can be used.

The following describes some examples of preferred embodiments of the present invention. A first example uses a nonmagnetic substrate made of an injection molded polycarbonate disk having a 3.5 inch in diameter. After cleaning, the substrate was introduced into a sputtering apparatus. On the substrate, a nonmagnetic alignment control layer of tantalum having a 5 nm thickness was formed under argon gas pressure of 0.67 Pa (5 mTorr). Subsequently, on the alignment control layer, a seed layer of platinum 5 nm thick was formed under argon gas pressure of 0.67 Pa (5 mTorr), and on the seed layer, a nonmagnetic underlayer of Ru20W alloy (solid solution of 20 at % tungsten in ruthenium) having a 5 nm thickness was formed under argon gas pressure of 2.0 Pa (15 mTorr). Then, on the nonmagnetic underlayer, a granular magnetic recording layer 15 nm thick was formed by RF sputtering using a target of Co10Cr14Pt containing 7 mol % of SiO2 under argon gas pressure of 0.67 Pa (5 mTorr). After laminating a carbon protective layer 10 nm thick over the magnetic layer, the resulting recording medium was taken out from the vacuum chamber of the sputtering apparatus. Applying liquid lubricant to the thickness of 1.5 nm on the protective layer, a magnetic recording medium having structure as shown in FIG. 1 was produced. Substrate heating prior to the deposition was not performed. A plurality of samples were additionally produced having the thickness of the magnetic recording layer in the range of 10 nm to 30 nm.

A second example of a perpendicular magnetic recording medium was produced in the same manner as in the first example except that the nonmagnetic underlayer was laminated using Ru30C alloy (solid solution of 30 at % carbon in ruthenium).

A third example of a perpendicular magnetic recording medium was produced in the same manner as in the first example except that the nonmagnetic underlayer was laminated using Ru22Mo alloy (solid solution of 22 at % molybdenum in ruthenium).

A fourth example of a perpendicular magnetic recording medium was produced in the same manner as in the first example except that the nonmagnetic underlayer was laminated using Ru5Cr10C alloy (solid solution of 5 at % chromium and 10 at % of carbon in ruthenium).

A fifth example of a perpendicular magnetic recording medium was produced in the same manner as in the first example except that the nonmagnetic alignment control layer 5 nm thick was laminated using Ni25P alloy (solid solution of 25 at % phosphorus in nickel).

A first comparative example of a perpendicular magnetic recording medium was produced in the same manner as in the first example except that the nonmagnetic underlayer 5 nm thick was laminated using pure ruthenium. A plurality of samples were additionally produced having the thickness of the magnetic recording layer in the range of 10 nm to 30 nm.

A second comparative example of a perpendicular magnetic recording medium was produced in the same manner as in the first comparative example except that the magnetic recording layer 15 nm thick was formed using Co20Cr10Pt4B that had a conventional structure, which does not have a granular structure.

A third comparative example of a perpendicular magnetic recording medium was produced in the same manner as in the second comparative example except that the nonmagnetic underlayer 5 nm thick was laminated using Ru20W alloy (solid solution of 20 at % tungsten in ruthenium).

A variety of measurements were taken on the perpendicular magnetic recording media of the examples and the comparative examples, including: coercive force Hc, dispersion of orientation distribution of axis of easy magnetization $\Delta\theta_{50}$, grain size of the magnetic recording layer, and normalized noise and SNR by electromagnetic conversion measurement. The results are given in Tables 1 and 2. The coercive force He was measured with a VSM (vibrating sample magnetometer). The $\Delta\theta_{50}$ is a half width of a rocking curve obtained by an X-ray diffraction apparatus. The electromagnetic conversion characteristics were measured with a spinning stand tester at the linear recording density of 400 kFCI. Normalized noise that is defined by root mean square of noises (in $\mu V$ unit)/output signal (in mV unit), $\mu V_{rms}/mV_{pp}$ and SNR (signal to noise ratio) are shown in the Tables. The grain size was measured by means of transmission electron microscopy (TEM). The measured results are given in Tables 1 and 2.

TABLE 1

(EXAMPLE 1 & COMPARATIVE EXAMPLES 1–3)

| | EXAMPLE 1 | COMP EXAMPLE 1 | COMP EXAMPLE 2 | COMP EXAMPLE 3 |
|---|---|---|---|---|
| NONMAGNETIC ALIGNMENT CONTROL LAYER | Ta | Ta | Ta | Ta |
| SEED LAYER | Pt | Pt | Pt | Pt |
| NONMAGNETIC UNDERLAYER | Ru20W | Ru | Ru | Ru20W |
| MAGNETIC RECORDING LAYER | Co10Cr14Pt 7SiO$_2$ | Co10Cr14Pt 7SiO$_2$ | Co20Cr10Pt 4B | Co20Cr10Pt 4B |
| COERCIVE FORCE Hc [kA/m (Oe)] | 258.6 (3250) | 221.0 (2778) | 203.6 (2559) | 231.3 (2906) |
| $\Delta\theta_{50}$ [deg] | 6.2 | 7.6 | 8.2 | 7.2 |
| GRAIN SIZE IN MAG RECORD LAYER [nm] | 6.1 | 10.8 | 13.4 | 7.3 |
| NORMALIZED NOISE | 70.3 | 82.3 | 102.9 | 87.1 |
| SNR [dB] | 17.1 | 14.5 | 13.7 | 15.7 |

TABLE 2

(EXAMPLES 2–5)

|  | EXAMPLE 2 | EXAMPLE 3 | EXAMPLE 4 | EXAMPLE 5 |
|---|---|---|---|---|
| NONMAGNETIC ALIGNMENT CONTROL LAYER | Ta | Ta | Ta | Ni25P |
| SEED LAYER | Pt | Pt | Pt | Pt |
| NONMAGNETIC UNDERLAYER | Ru30C | Ru22Mo | Ru5Cr10C | Ru20W |
| MAGNETIC RECORDING LAYER | Co10Cr14Pt 7SiO$_2$ | Co10Cr14Pt 7SiO$_2$ | Co10Cr14Pt 7SiO$_2$ | Co10Cr14Pt 7SiO$_2$ |
| COERCIVE FORCE Hc [kA/m (Oe)] | 253.7 (3188) | 273.3 (3435) | 258.2 (3245) | 195.8 (3180) |
| $\Delta\theta_{50}$ [deg] | 5.4 | 5.9 | 5.2 | 6.4 |
| GRAIN SIZE IN MAG RECORD LAYER [nm] | 6.5 | 6.2 | 6.5 | 6.2 |
| NORMALIZED NOISE | 77.8 | 68.5 | 75.4 | 71.5 |
| SNR [dB] | 16.2 | 17.6 | 16.6 | 16.9 |

Table 1 indicates the difference in coercive force HC between the first and second comparative examples. The major reason for the difference lies with the platinum content of the magnetic recording layer, since the other layers are the same in the first and second comparative examples. Comparing the first comparative example to the first to fifth examples, which all use a granular film for the magnetic recording layer, it can be seen that remarkable improvement has been achieved in the electromagnetic conversion characteristics by employing a nonmagnetic underlayer according to the invention. As is apparent from the comparison between the second and third comparative examples, improvement in the electromagnetic conversion characteristics can be achieved also in a magnetic recording layer having a conventional (not granular structure) when a nonmagnetic underlayer according to the invention is employed.

Figure 2:
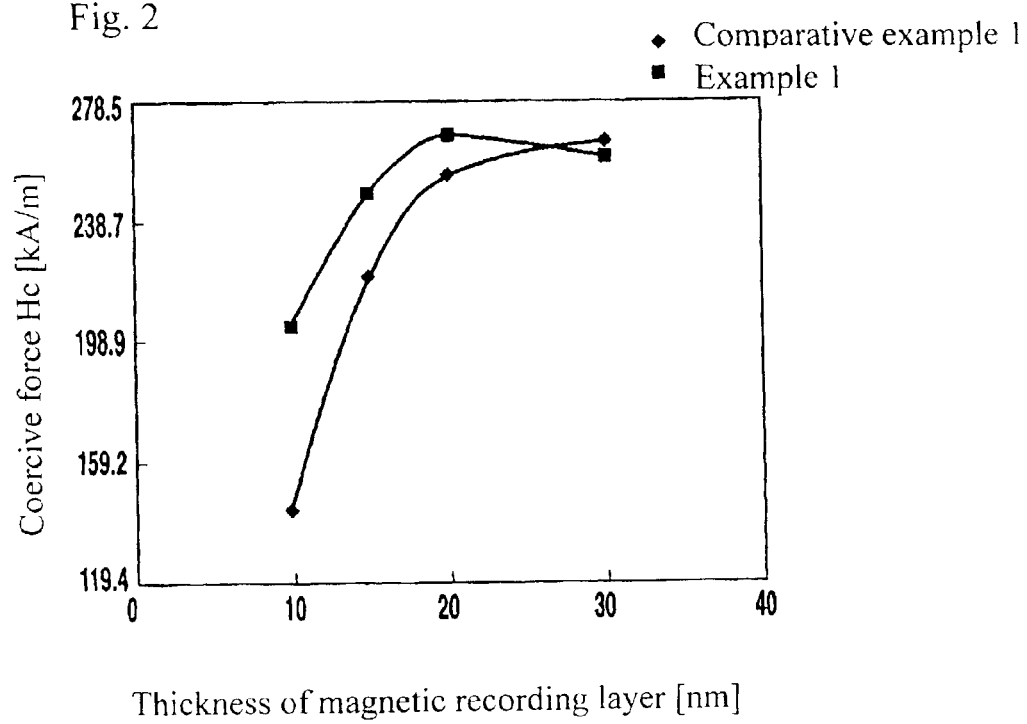
FIG. 2 is a graph showing the relationship between the coercive force Hc and the thickness of the magnetic recording layer.

Concerning coercive force Hc, FIG. 2 shows the variation of Hc between the first comparative example and the first example in relation to the thickness of the magnetic recording layer. In the first comparative example, which uses a nonmagnetic underlayer of pure ruthenium, Hc rapidly drops as the magnetic recording layer becomes thinner because the initial growth layer in the magnetic recording layer is large. In contrast, in the first example, which uses Ru20W for the nonmagnetic underlayer and a granular magnetic recording layer for the magnetic recording layer, decrease in the Hc is slower even when the magnetic recording layer is thin. This also shows decrease in the initial growth layer in the magnetic recording layer. Other examples that used different materials for the nonmagnetic underlayer also showed similar improvements brought about by the decrease of the initial growth layer in the magnetic recording layer.

Next, looking at the dispersion of orientation distribution $\Delta\theta_{50}$, the values are 7.6° in the medium of the first comparative example, 7.2° in the medium of the third comparative example, while 5.2° to 6.4° in the media of the first to fifth examples according to the present invention. This illustrates that the alignment in the magnetic recording layer has been improved. As the comparison of the fifth and first examples indicates, using Ni25P for the nonmagnetic alignment control layer instead of Ta also shows similar improvements.

As for the grain size of the magnetic recording layer, because a fine grain size can be attained when a granular magnetic recording layer is employed for the magnetic recording layer, 2.6 nm reduction of the grain size can be achieved using the magnetic layer according to the present invention in comparison to the first and second comparative examples, even though both use an underlayer of pure ruthenium. Further, as illustrated in the first to fourth examples, by employing a ruthenium base alloy for the nonmagnetic underlayer, the grain size was reduced by at least 4.3 nm.

As described above, reduction of the initial growth layer and decrease of the grain size have been achieved in the all of the examples according to the present invention by using a ruthenium-base alloy. These crystallographic improvements are reflected in the noise reduction and the remarkable improvement in the SNR.

It has been demonstrated that the initial growth layer in the magnetic recording layer is decreased and the grain size of the magnetic recording layer is minimized by employing a nonmagnetic underlayer made of an alloy of ruthenium with one or more additives selected from the group consisting essentially of C, Cu, W, Mo, Cr, Ir, Pt, Re, Rh, Ta, and V, and a magnetic recording layer of a granular film, resulting in reduced noises and enhanced SNR. Although every material for magnetic underlayer listed above can produce similar improvements, ruthenium that contains an additive of tungsten or molybdenum achieves superior effects in the present studies.

Since excellent characteristics can be easily attained by employing the layer structure according to the present invention, substrate heating becomes unnecessary in the laminating process in a medium of the invention. Consequently, inexpensive plastics can be used for a substrate as well as a conventional aluminum substrate and a glass substrate.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-374896, in its entirety, including the drawings, claims, and the specification thereof, is incorporated herein by reference.

We claim:

1. A perpendicular magnetic recording medium comprising:
   a nonmagnetic substrate;
   a nonmagnetic alignment control layer formed on the substrate;
   a seed layer composed of a metal or alloy having a fcc crystal structure formed on the alignment control layer;
   a nonmagnetic underlayer composed of a metal or alloy having a hcp crystal structure formed on the seed layer; and
   a magnetic recording layer consisting of ferromagnetic crystal grains and a nonmagnetic grain boundary phase mainly of an oxide surrounding the ferromagnetic crystal grains, the recording layer being formed on the underlayer,
   wherein the nonmagnetic alignment control layer is composed of NiP or CoZr having an amorphous structure.

2. A perpendicular magnetic recording medium according to claim 1, wherein the nonmagnetic underlayer is composed of a ruthenium base alloy having the hcp structure.

3. A perpendicular magnetic recording medium according to claim 1, wherein the nonmagnetic underlayer is composed of a ruthenium base alloy containing one or more elements selected from the group consisting of C, Cu, W, Mo, Cr, Ir, Pt, Re, Rh, Ta, and V.

4. A perpendicular magnetic recording medium according to claim 1, wherein the nonmagnetic underlayer is composed of a ruthenium base alloy containing at least one of at most 32 at % of tungsten, at most 36 at % of molybdenum, at most 40 at % of chromium, at most 44 at % of iridium, at most 20 at % of platinum, at most 60 at % of rhodium, at most 20 at % of tantalum, and at most 16 at % of vanadium.

5. A perpendicular magnetic recording medium according to claim 1, wherein the nonmagnetic substrate is composed of a plastic resin.

6. A perpendicular magnetic recording medium according to claim 1, further including a protective film formed on the recording layer, and a liquid lubrication layer formed on the protective film.

7. A perpendicular magnetic recording medium according to claim 1, wherein the seed layer is composed of a metal containing Cu, Au, Pd, Pt, and Ir, of an alloy containing at least one of Cu, Au, Pd, Pt, and Ir, or of an alloy containing at least Ni and Fe.

8. A perpendicular magnetic recording medium according to claim 2, wherein the seed layer is composed of a metal containing Cu, Au, Pd, Pt, and Ir, of an alloy containing at least one of Cu, Au, Pd, Pt, and Ir, or of an alloy containing at least Ni and Fe.

9. A perpendicular magnetic recording medium according to claim 3, wherein the seed layer is composed of a metal containing Cu, Au, Pd, Pt, and Ir, of an alloy containing at least one of Cu, Au, Pd, Pt, and Ir, or of an alloy containing at least Ni and Fe.

10. A perpendicular magnetic recording medium according to claim 4, wherein the seed layer is composed of a metal containing Cu, Au, Pd, Pt, and Ir, of an alloy containing at least one of Cu, Au, Pd, Pt, and Ir, or of an alloy containing at least Ni and Fe.

11. A perpendicular magnetic recording medium according to claim 1, wherein the oxide forming the nonmagnetic grain boundary phase in the magnetic recording layer is selected from the group consisting of Cr, Co, Si, Al, Ti, Ta, Hf, and Zr.

12. A perpendicular magnetic recording medium according to claim 2, wherein the oxide forming the nonmagnetic grain boundary phase in the magnetic recording layer is selected from the group consisting of Cr, Co, Si, Al, Ti, Ta, Hf, and Zr.

13. A perpendicular magnetic recording medium according to claim 3, wherein the oxide forming the nonmagnetic grain boundary phase in the magnetic recording layer is selected from the group consisting of Cr, Co, Si, Al, Ti, Ta, Hf, and Zr.

14. A perpendicular magnetic recording medium according to claim 4, wherein the oxide forming the nonmagnetic grain boundary phase in the magnetic recording layer is selected from the group consisting of Cr, Co, Si, Al, Ti, Ta, Hf, and Zr.

15. A perpendicular magnetic recording medium according to claim 7, wherein the oxide forming the nonmagnetic grain boundary phase in the magnetic recording layer is selected from the group consisting of Cr, Co, Si, Al, Ti, Ta, Hf, and Zr.

16. A perpendicular magnetic recording medium according to claim 8, wherein the oxide forming the nonmagnetic grain boundary phase in the magnetic recording layer is selected from the group consisting of Cr, Co, Si, Al, Ti, Ta, Hf, and Zr.

17. A perpendicular magnetic recording medium according to claim 9, wherein the oxide forming the nonmagnetic grain boundary phase in the magnetic recording layer is selected from the group consisting of Cr, Co, Si, Al, Ti, Ta, Hf, and Zr.

18. A perpendicular magnetic recording medium according to claim 10, wherein the oxide forming the nonmagnetic grain boundary phase in the magnetic recording layer is selected from the group consisting of Cr, Co, Si, Al, Ti, Ta, Hf, and Zr.

19. A method of manufacturing a perpendicular magnetic recording medium comprising steps of:
    depositing a nonmagnetic alignment control layer on the substrate;
    depositing a seed layer of a metal or alloy having a fcc crystal structure on the alignment control layer;
    depositing a nonmagnetic underlayer of a metal or alloy having a hcp crystal structure on the seed layer; and
    depositing a magnetic recording layer on the underlayer, the magnetic recording layer consisting of ferromagnetic crystal grains and a nonmagnetic grain boundary phase mainly of an oxide surrounding the ferromagnetic crystal grains,
    wherein the nonmagnetic alignment control layer is composed of NiP or CoZr having an amorphous structure.

20. A method of manufacturing a perpendicular magnetic recording medium according to claim 19, wherein at least the nonmagnetic alignment control layer, the seed layer, the nonmagnetic underlayer, and the magnetic recording layer are deposited without preheating the substrate.

21. A method of manufacturing a perpendicular magnetic recording medium according to claim 19, wherein the nonmagnetic underlayer is composed of a ruthenium base alloy having the hcp structure.

22. A method of manufacturing a perpendicular magnetic recording medium according to claim 19, wherein the nonmagnetic underlayer is composed of a ruthenium base alloy containing one or more elements selected from the group consisting of C, Cu, W, Mo, Cr, Ir, Pt, Re, Rh, Ta, and V.

23. A method of manufacturing a perpendicular magnetic recording medium according to claim 19, wherein the oxide forming the nonmagnetic grain boundary phase in the magnetic recording layer is selected from the group consisting of Cr, Co, Si, Al, Ti, Ta, Hf, and Zr.

24. A method of manufacturing a perpendicular magnetic recording medium according to claim 19, wherein the nonmagnetic underlayer is composed of a ruthenium base alloy containing at least one of at most 32 at % of tungsten, at most 36 at % of molybdenum, at most 40 at % of chromium, at most 44 at % of iridium, at most 20 at % of platinum, at most 60 at % of rhodium, at most 20 at % of tantalum, and at most 16 at % of vanadium.

25. A method of manufacturing a perpendicular magnetic recording medium according to claim 19, wherein the seed layer is composed of a metal containing Cu, Au, Pd, Pt, and Ir, of an alloy containing at least one of Cu, Au, Pd, Pt, and Ir, or of an alloy containing at least Ni and Fe.

26. A method of manufacturing a perpendicular magnetic recording medium according to claim 19, wherein the nonmagnetic substrate is composed of a plastic resin.

27. A perpendicular magnetic recording medium produced according to claim 19.

28. A method of manufacturing a perpendicular magnetic recording medium according to claim 19, further including the step of depositing a protective film on the recording layer.

* * * * *